United States Patent
Bi

(10) Patent No.: US 8,928,589 B2
(45) Date of Patent: Jan. 6, 2015

(54) VIRTUAL KEYBOARDS AND METHODS OF PROVIDING THE SAME

(75) Inventor: Ning Bi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 151 days.

(21) Appl. No.: 13/090,497

(22) Filed: Apr. 20, 2011

(65) Prior Publication Data

US 2012/0268376 A1     Oct. 25, 2012

(51) Int. Cl.
| G06F 3/02 | (2006.01) |
| G06F 3/048 | (2013.01) |
| G06F 3/042 | (2006.01) |
| G06F 3/00 | (2006.01) |
| G06F 3/01 | (2006.01) |
| G06F 3/023 | (2006.01) |
| G06F 3/03 | (2006.01) |

(52) U.S. Cl.
CPC ........... *G06F 3/0425* (2013.01); *G06F 3/005* (2013.01); *G06F 3/017* (2013.01); *G06F 3/0233* (2013.01); *G06F 3/0304* (2013.01)
USPC ............ 345/168; 715/757; 715/771; 715/773

(58) Field of Classification Search
USPC ........... 345/168, 169, 175; 715/757, 771, 773
See application file for complete search history.

(56) References Cited

U.S. PATENT DOCUMENTS

| 5,168,531 | A | * | 12/1992 | Sigel | 382/291 |
| 5,563,988 | A | * | 10/1996 | Maes et al. | 345/421 |
| 5,581,276 | A | * | 12/1996 | Cipolla et al. | 345/156 |
| 5,594,469 | A | * | 1/1997 | Freeman et al. | 345/158 |
| 5,617,312 | A | * | 4/1997 | Iura et al. | 700/83 |
| 6,002,808 | A | * | 12/1999 | Freeman | 382/288 |
| 6,037,882 | A | * | 3/2000 | Levy | 341/20 |
| 6,075,895 | A | * | 6/2000 | Qiao et al. | 382/218 |
| 6,088,018 | A |   | 7/2000 | DeLeeuw et al. |  |
| 6,191,773 | B1 | * | 2/2001 | Maruno et al. | 345/158 |
| 6,498,628 | B2 | * | 12/2002 | Iwamura | 348/734 |
| 6,501,515 | B1 | * | 12/2002 | Iwamura | 348/734 |
| 6,512,838 | B1 | * | 1/2003 | Rafii et al. | 382/106 |
| 6,594,616 | B2 |   | 7/2003 | Zhang et al. |  |
| 6,600,475 | B2 | * | 7/2003 | Gutta et al. | 345/156 |
| 6,614,422 | B1 | * | 9/2003 | Rafii et al. | 345/168 |

(Continued)

OTHER PUBLICATIONS

Kölsch, M. and Turk, M., Keyboards without Keyboards: A Survey of Virtual Keyboards, Proc. Workshop/ Symposium on Sensing and Input for Media-centric Systems (2002).

(Continued)

*Primary Examiner* — Amare Mengistu
*Assistant Examiner* — Michael J Jansen, II
(74) *Attorney, Agent, or Firm* — James R. Gambale, Jr.

(57) ABSTRACT

The present disclosure provides systems, methods and apparatus, including computer programs encoded on computer storage media, for providing virtual keyboards. In one aspect, a system includes a camera, a display, a video feature extraction module and a gesture pattern matching module. The camera captures a sequence of images containing a finger of a user, and the display displays each image combined with a virtual keyboard having a plurality of virtual keys. The video feature extraction module detects motion of the finger in the sequence of images relative to virtual sensors of the virtual keys, and determines sensor actuation data based on the detected motion relative to the virtual sensors. The gesture pattern matching module uses the sensor actuation data to recognize a gesture.

40 Claims, 12 Drawing Sheets

(56) References Cited

U.S. PATENT DOCUMENTS

| | | | | |
|---|---|---|---|---|
| 6,674,895 | B2* | 1/2004 | Rafii et al. | 382/154 |
| 6,690,354 | B2* | 2/2004 | Sze | 345/156 |
| 6,738,041 | B2* | 5/2004 | Silber | 345/158 |
| 6,771,277 | B2* | 8/2004 | Ohba | 345/629 |
| 6,826,292 | B1* | 11/2004 | Tao et al. | 382/103 |
| 7,042,442 | B1* | 5/2006 | Kanevsky et al. | 345/169 |
| 7,058,204 | B2* | 6/2006 | Hildreth et al. | 382/103 |
| 7,129,927 | B2* | 10/2006 | Mattsson | 345/158 |
| 7,227,526 | B2* | 6/2007 | Hildreth et al. | 345/156 |
| 7,342,574 | B1* | 3/2008 | Fujioka | 345/175 |
| 7,417,681 | B2* | 8/2008 | Lieberman et al. | 348/333.1 |
| 7,421,093 | B2* | 9/2008 | Hildreth et al. | 382/103 |
| 7,555,142 | B2* | 6/2009 | Hildreth et al. | 382/103 |
| 7,598,942 | B2* | 10/2009 | Underkoffler et al. | 345/158 |
| 7,893,924 | B2* | 2/2011 | Lieberman et al. | 345/156 |
| 7,898,522 | B2* | 3/2011 | Hildreth et al. | 345/156 |
| 7,911,447 | B2* | 3/2011 | Kouno | 345/158 |
| 7,969,409 | B2* | 6/2011 | Krepec | 345/156 |
| 7,975,243 | B2* | 7/2011 | Zheng et al. | 715/863 |
| 8,009,141 | B1* | 8/2011 | Chi et al. | 345/156 |
| 8,035,614 | B2* | 10/2011 | Bell et al. | 345/158 |
| 8,131,015 | B2* | 3/2012 | Hildreth et al. | 382/103 |
| 8,144,118 | B2* | 3/2012 | Hildreth | 345/156 |
| 8,144,121 | B2* | 3/2012 | Kitaura | 345/156 |
| 8,203,530 | B2* | 6/2012 | Chiang | 345/157 |
| 8,248,364 | B1* | 8/2012 | Chi et al. | 345/156 |
| 8,259,163 | B2* | 9/2012 | Bell | 348/51 |
| 8,274,535 | B2* | 9/2012 | Hildreth et al. | 345/676 |
| 8,325,214 | B2* | 12/2012 | Hildreth | 348/14.03 |
| 8,363,010 | B2* | 1/2013 | Nagata | 345/158 |
| 8,472,665 | B2* | 6/2013 | Hildreth | 382/103 |
| 8,514,251 | B2* | 8/2013 | Hildreth et al. | 345/635 |
| 8,515,128 | B1* | 8/2013 | Hildreth | 382/103 |
| 8,547,327 | B2* | 10/2013 | Clarkson et al. | 345/156 |
| 8,555,207 | B2* | 10/2013 | Hildreth et al. | 715/863 |
| 8,659,548 | B2* | 2/2014 | Hildreth | 345/168 |
| 8,726,194 | B2* | 5/2014 | Hildreth | 715/859 |
| 2002/0041327 | A1* | 4/2002 | Hildreth et al. | 348/42 |
| 2002/0057260 | A1* | 5/2002 | Mathews et al. | 345/173 |
| 2002/0060669 | A1* | 5/2002 | Sze | 345/173 |
| 2002/0064382 | A1* | 5/2002 | Hildreth et al. | 396/100 |
| 2002/0075240 | A1* | 6/2002 | Lieberman et al. | 345/170 |
| 2003/0063775 | A1* | 4/2003 | Rafii et al. | 382/106 |
| 2003/0132950 | A1* | 7/2003 | Surucu et al. | 345/700 |
| 2003/0218760 | A1* | 11/2003 | Tomasi et al. | 356/614 |
| 2004/0108990 | A1* | 6/2004 | Lieberman et al. | 345/156 |
| 2005/0024324 | A1* | 2/2005 | Tomasi et al. | 345/156 |
| 2006/0034042 | A1* | 2/2006 | Hisano et al. | 361/681 |
| 2006/0098873 | A1* | 5/2006 | Hildreth et al. | 382/181 |
| 2006/0101349 | A1* | 5/2006 | Lieberman et al. | 715/773 |
| 2006/0192782 | A1* | 8/2006 | Hildreth | 345/473 |
| 2006/0238548 | A1 | 10/2006 | Stotts, Jr. et al. | |
| 2007/0063979 | A1* | 3/2007 | Tran | 345/169 |
| 2007/0115261 | A1* | 5/2007 | Cho et al. | 345/168 |
| 2007/0222760 | A1* | 9/2007 | Lieberman et al. | 345/168 |
| 2008/0018595 | A1* | 1/2008 | Hildreth et al. | 345/156 |
| 2008/0030459 | A1 | 2/2008 | Kouno | |
| 2008/0030460 | A1* | 2/2008 | Hildreth et al. | 345/156 |
| 2008/0056536 | A1* | 3/2008 | Hildreth et al. | 382/103 |
| 2008/0180399 | A1* | 7/2008 | Cheng | 345/173 |
| 2008/0259053 | A1* | 10/2008 | Newton | 345/175 |
| 2008/0273755 | A1* | 11/2008 | Hildreth | 382/103 |
| 2009/0027337 | A1 | 1/2009 | Hildreth et al. | |
| 2009/0031240 | A1* | 1/2009 | Hildreth | 715/772 |
| 2009/0055126 | A1* | 2/2009 | Yanovich et al. | 702/179 |
| 2009/0055692 | A1* | 2/2009 | Kroupnova et al. | 714/57 |
| 2009/0079813 | A1* | 3/2009 | Hildreth | 348/14.03 |
| 2009/0217211 | A1* | 8/2009 | Hildreth et al. | 715/863 |
| 2009/0228841 | A1* | 9/2009 | Hildreth | 715/863 |
| 2009/0262098 | A1* | 10/2009 | Yamada | 345/175 |
| 2009/0262984 | A1* | 10/2009 | Hildreth et al. | 382/103 |
| 2009/0309851 | A1* | 12/2009 | Bernstein | 345/174 |
| 2009/0315740 | A1* | 12/2009 | Hildreth et al. | 341/20 |
| 2010/0067181 | A1* | 3/2010 | Bair et al. | 361/679.3 |
| 2010/0067789 | A1* | 3/2010 | Cai et al. | 382/166 |
| 2010/0091110 | A1* | 4/2010 | Hildreth | 348/169 |
| 2010/0177035 | A1 | 7/2010 | Schowengerdt et al. | |
| 2010/0199228 | A1* | 8/2010 | Latta et al. | 715/863 |
| 2010/0225443 | A1* | 9/2010 | Bayram et al. | 340/5.83 |
| 2010/0231522 | A1* | 9/2010 | Li | 345/169 |
| 2010/0259482 | A1* | 10/2010 | Ball | 345/168 |
| 2010/0302165 | A1* | 12/2010 | Li | 345/168 |
| 2011/0080490 | A1* | 4/2011 | Clarkson et al. | 348/222.1 |
| 2012/0260207 | A1* | 10/2012 | Treskunov et al. | 715/773 |

OTHER PUBLICATIONS

Kim, S. and Kim, G., Using keyboards with head mounted displays, Proc. ACM SIGGRAPH international conference on Virtual Reality continuum and its applications in industry (2004), pp. 336-343.

Ahmad, F. and Musilek, P., UbiHand a wearable input device for 3D interaction, ACM SIGGRAPH Research posters (2006), p. 159.

Ali Erol, George Bebis, Mircea Nicolescu, Richard D. Boyle, Xander Twombly, Vision-based hand pose estimation: A review. Computer Vision and Image Understanding 108 (2007) 52-73.

Roeber H., Bacus J., and Tomasi C., Typing in thin air: the canesta projection keyboard—a new method of interaction with electronic devices, ACM CHI extended abstracts (2003), pp. 712-713.

Kazuhiro Terajima, Takashi Komuro, Masatoshi Ishikawa:, Fast Finger Tracking System for In-air Typing Interface, The 27th Annual CHI Conference on Human Factors in Computer Systems (CHI2009) (Boston, Apr. 7, 2009) / Extended Abstracts, pp. 3739-3744.

Yuki Hirobe, Takehiro Niikura, Yoshihiro Watanabe, Takashi Komuro, Masatoshi Ishikawa, Vision-based Input Interface for Mobile Devices with High-speed Fingertip Tracking, 22nd ACM Symposium on User Interface Software and Technology (UIST2009) (Victoria, Oct. 5, 2009) / Adjunct Proceedings, pp. 7-8.

L. R. Rabiner and B. Juang, Fundamentals of speech recognition, Prentice-Hall, Inc., 1993 (Chapter 4).

Stotts et al., FaceSpace: endo-and exo-spatial hypermedia in the transparent video facetop, the fifteenth ACM conference on Hypertext and hypermedia (2004), pp. 48-57.

Stotts et al., The Vis-a-Vid Transparent Video Face Top, proceedings of ACM UIST (2003), pp. 57-58.

Habib et al., Real time mono vision gesture based virtual keyboard system, Consumer Electronics, IEEE Transactions on, vol. 52, No. 4, Nov. 2006, pp. 1261-1266.

Alon, J., et al., "Accurate and Efficient Gesture Spotting via Pruning and Subgesture Reasoning", Jan. 1, 2005, Computer Vision in Human-Computer Interaction Lecture Notes in Computer Science; LNCS, Springer, Berlin, DE, pp. 189-198, XP019022549, ISBN: 978-3-540-29620-1.

International Search Report—PCT/US2012/034122—ISA/EPO—Jan. 2, 2013.

Li, H., et al., "Model-based segmentation and recognition of dynamic gestures in continuous video streams", Pattern Recognition, Elsevier, GB, vol. 44, No. 8, Dec. 21, 2010, pp. 1614-1628, XP028371854, ISSN: 0031-3203, DOI: 10.1016/J.PATCOG.2010.12.014.

\* cited by examiner

VIRTUAL KEYBOARDS AND METHODS OF PROVIDING THE SAME

TECHNICAL FIELD

The present disclosure relates to virtual keyboards. More specifically, this disclosure relates to presenting keyboard images onto an electronic display and using a digital camera to detect the position of a user's fingers with respect to the displayed keyboard in order to input data into a computer system.

DESCRIPTION OF THE RELATED TECHNOLOGY

Electronic devices, including personal computers and mobile phones, can have a keyboard or keypad for receiving input from a user. The keyboard can include an arrangement of buttons or keys, and can operate using mechanical switching devices. Alternatively, the keyboard can be a virtual keyboard displayed on a display of the electronic device, and a user can provide input by contacting a touch-sensitive surface of the display.

Certain electronic devices, such as mobile phones, can have relatively small displays. In certain instances, it can be difficult for a user to type characters or input other commands by touching the display screen. For example, a user's finger may cover more than one virtual key, thereby increasing the likelihood of a typing mistake. Moreover, during input, a user's hand can block portions of the display, thereby blocking information presented on the display and making it difficult for a user to determine whether a proper key has been selected.

SUMMARY

The systems, methods and devices of the present disclosure each have several innovative aspects, no single one of which is solely responsible for the desirable attributes disclosed herein.

In one aspect, a system for inputting data into a computing device is provided. The system includes a camera for capturing a sequence of images containing a finger of a user, a display for displaying each image of the sequence combined with a virtual keyboard, and a video feature extraction module configured to detect motion of the user's finger in the sequence of images relative to the virtual keyboard. The position of the finger in the displayed image relative to the virtual keyboard changes as the finger of the user moves relative to the camera, and the virtual keyboard includes a plurality of virtual keys, each virtual key having a plurality of virtual sensors. The video feature extraction module captures sensor actuation data of the virtual sensors using the detected motion. The system further includes a gesture pattern matching module for using the sensor actuation data to recognize a user's gesture and input data into the computing device.

In another aspect, a method for inputting data into an electronic device using a virtual keyboard is provided. The method includes receiving a sequence of images containing a finger of a user, generating a combined image for each image of the sequence, the combined image containing the finger of the user and a virtual keyboard, and detecting a motion of the finger in the sequence of images relative to the virtual keyboard. The virtual keyboard has a plurality of virtual keys, and each virtual key has a plurality of virtual sensors. The method further includes generating sensor actuation data by comparing a pixel region of the detected motion to a pixel region of the virtual sensors, and recognizing a gesture using the sensor actuation data to input data into the electronic device.

In another aspect, a system for inputting data into a computing device is provided. The system includes means for capturing a sequence of images containing a finger of a user, means for displaying each image of the sequence combined with a virtual keyboard, and means for detecting motion of the user's finger in the sequence of images relative to the virtual keyboard. The position of the finger in the displayed image relative to the virtual keyboard changes as the finger of the user moves relative to the camera, and the virtual keyboard includes a plurality of virtual keys, each virtual key having a plurality of virtual sensors. The means for detecting motion captures sensor actuation data of the virtual sensors using the detected motion. The system further includes means for recognizing a user's gesture using the sensor actuation data to input data into the computing device.

In another aspect, a non-transitory computer-readable storage medium includes instructions that when executed perform a method of inputting data into an electronic device using a virtual keyboard. The method includes receiving a sequence of images containing a finger of a user, generating a combined image for each image of the sequence, the combined image containing the finger of the user and a virtual keyboard, and detecting a motion of the finger in the sequence of images relative to the virtual keyboard. The virtual keyboard has a plurality of virtual keys, and each virtual key has a plurality of virtual sensors. The method further includes generating sensor actuation data by comparing a pixel region of the detected motion to a pixel region of the virtual sensors, and recognizing a gesture using the sensor actuation data to input data into the electronic device.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
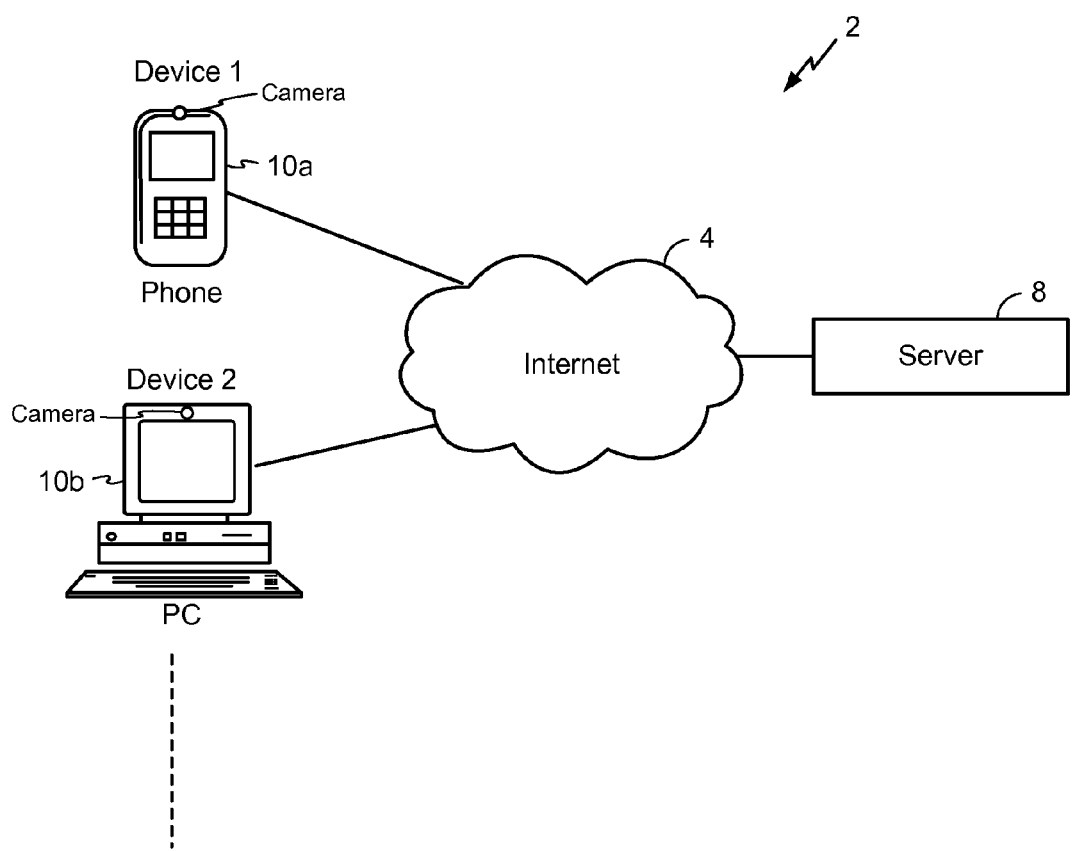
FIG. 1 is a schematic diagram of a network having a server and connected devices according to one embodiment.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Embodiments of the invention relate to systems and methods for controlling virtual keyboards. The virtual keyboards described herein can be used to provide input into a user device. For example, in an embodiment in which the user device is a mobile phone, the user can dial phone numbers, type in a text message and/or input a control command using the virtual keyboard. In this embodiment, the user device includes a camera, a display, and a processor. The camera can capture an image of the user, and the processor can overlay an image of the virtual keyboard on the captured image. To operate the virtual keyboard, the user can make a gesture, such as a finger typing motion, using her fingers or hands in the air, and need not touch a surface of the display.

In certain embodiments, the virtual keyboard can include a plurality of virtual keys, each virtual key having a plurality of virtual sensors. The motion of the user's hand and/or finger can be determined and measured relative to the virtual sensors, and the sequence of sensor data can be analyzed against a series of gesture recognition templates associated with various user gestures. In one embodiment, dynamic time warping (DTW) is employed to match user gestures of varying speeds.

The invention is operational with numerous other general purpose or special purpose computing system environments or configurations. Examples of well known computing systems, environments, and/or configurations that may be suitable fore use with the invention include, but are not limited to, personal computers, server computers, hand-held or laptop devices, multiprocessor systems, microprocessor-based systems, programmable consumer electronics, network PCs, minicomputers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN) or Wide Area Network (WAN) may be a corporate computing network, including access to the Internet, to which computers and computing devices comprising the system are connected. In one embodiment, the LAN conforms to the Transmission Control Protocol/Internet Protocol (TCP/IP) industry standard.

As used herein, media refers to images, sounds, video or any other multimedia type data that is entered into the system.

A microprocessor may be any conventional general purpose single- or multi-chip microprocessor such as a Pentium® processor, Itanium® processor or an ALPHA® processor. In addition, the microprocessor may be any conventional special purpose microprocessor such as a digital signal processor (DSP) or a graphics processor.

The system is comprised of various modules as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®. Additionally, the system may be written in any suitable programming language, including a conventional programming language such as C, C++, BASIC, Pascal, Perl, or Java.

A web browser comprising a web browser user interface may be used to display information (such as textual and graphical information) to a user. The web browser may comprise any type of visual display capable of displaying information received via a network. Examples of web browsers include Microsoft's Internet Explorer browser, Apple's Safari browser, Mozilla's Firefox browser, PalmSource's Web Browser, Google's Chrome browser or any other browsing or other application software capable of communicating with a network. In certain embodiments, a web browser can include a virtual keyboard interface.

Embodiments of the invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Overview of User Devices

FIG. 1 is a schematic diagram of a network 2. The illustrated network 2 includes a user device 10a, a user device 10b, and a server 8, each in communication with the Internet 4. Although only the user devices 10a, 10b and the server 8 are illustrated, the network 2 can include additional user devices and servers.

As shown in FIG. 1, the user device 10a is a mobile phone and the user device 10b is a personal computer. However, the user devices can be any suitable communication device for use with a network. The user devices 10a, 10b can include a display and a camera, and can be configured to operate using a virtual keyboard, as will be described in further detail herein. A user can provide input into to the user device using the virtual keyboard. The input can include, for example, text, numbers, symbols, and/or control commands.

The user devices can be used to transmit information to and receive information from other devices over the Internet 4. For example, the user device 10a can communicate with the user device 10b and/or the server 8. The information communicated can include, for example, voice, data, and/or multimedia services, and all of a portion of the information transmitted or received can be obtained from a virtual keyboard. Additionally, a virtual keyboard can be used by a user to aid in controlling the communication of the user device with the Internet 4. For example, the user can provide control commands to navigate the internet using the virtual keyboard. Additionally, a web browser can include a virtual keyboard interface, and a user may request multimedia from the server 8 by providing input into the virtual keyboard. The user device can also be used to communicate over networks besides the Internet 4, including, for example, cellular networks.

The user devices can communicate using a variety of standards. For example, certain user devices can communication according to IEEE 16.11 standard, including IEEE 16.11(a), (b), or (g), or the IEEE 802.11 standard, including IEEE 802.11a, b, g or n. In some embodiments, the user device can include an antenna for transmitting and receiving RF signals according to the BLUETOOTH standard. For certain user devices, such as when the user device is a mobile phone, the user device can communicate using an antenna designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology.

Figure 2:
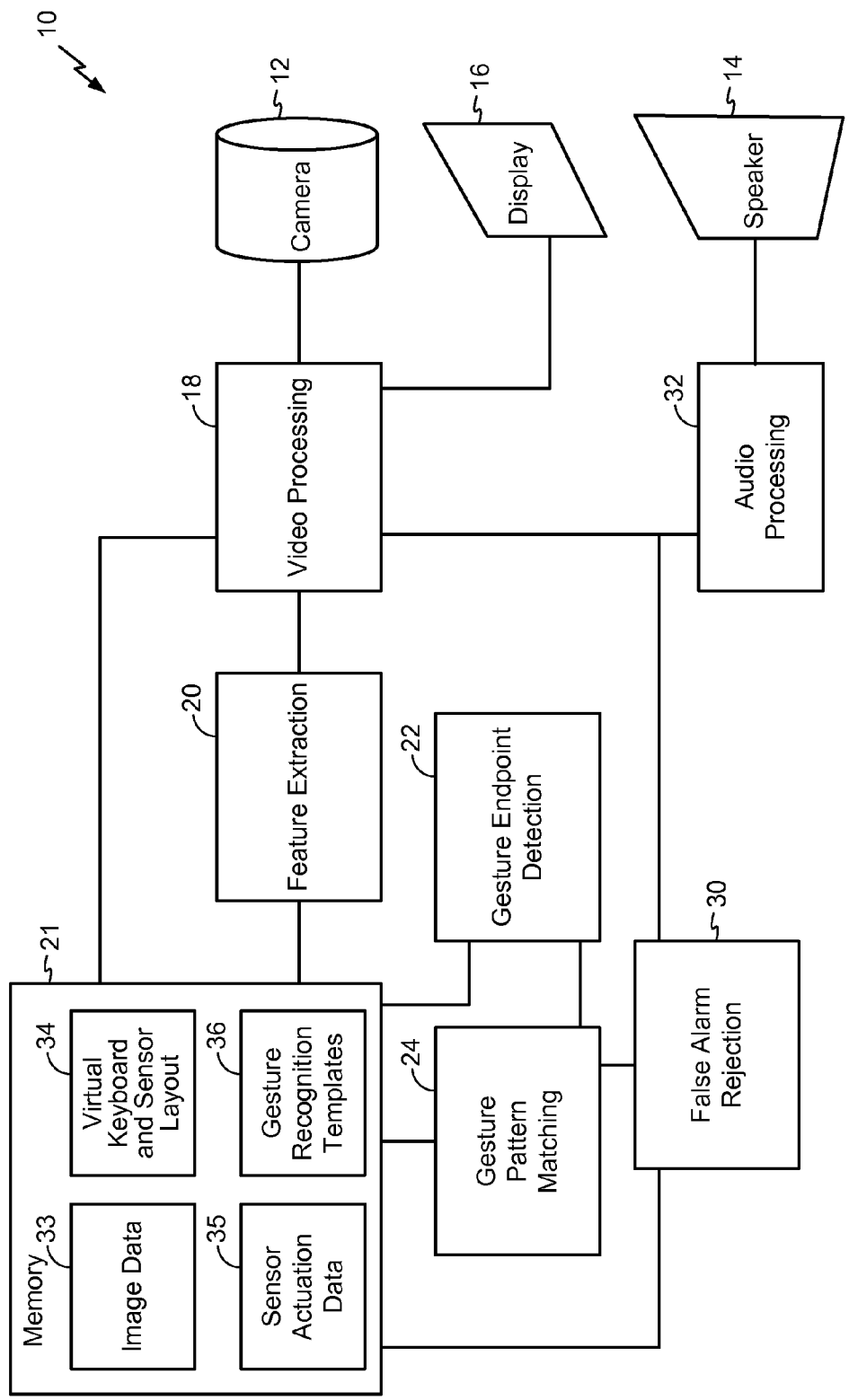
FIG. 2 is a schematic diagram of one embodiment of a user device having a virtual keyboard.

FIG. 2 is a schematic diagram of one embodiment of a user device 10 having a virtual keyboard. The user device 10 includes a camera 12, a speaker 14, a display 16, a video processing module 18, a feature extraction module 20, a memory 21, a gesture endpoint detection module 22, a gesture pattern matching module 24, a false alarm rejection module 30, and an audio processing module 32. The user device 10 can be, for example, a mobile phone or personal computer. However, the same components of the user device 10 or slight variations thereof are also illustrative of other types of devices such as televisions and portable media players.

The various modules can be implemented in various combinations of hardware and/or software. For example, the video processing module 18, the feature extraction module 20, the gesture endpoint detection module 22, the gesture pattern matching module 24, the false alarm rejection module 30, and/or the audio processing module 32 can be implemented as instructions stored on a computer readable storage medium configured to execute using one or more processors. Additional details regarding the implementation of the modules will be described in detail later below.

The camera 12 can be a variety of camera types. For example, the camera 12 can be a front mounted camera of a mobile phone, including a camera having a fixed-focal-length lens. Alternatively, the camera 12 can be a webcam communicating with a computer over a port. The camera 12 can include an image sensor, such as a complimentary metal-oxide-semiconductor (CMOS) sensor or a charge-coupled device (CCD) sensor. As will be described in detail below, the user device 10 can provide a virtual keyboard using a relatively simple camera 12, including, for example, a camera having a relatively low frame rate, such as a frame rate of about 30 fps. Thus, the user device 10 can provide a virtual keyboard even when the user device 10 does not include a relatively high-speed camera, or a camera having zoom, infrared, depth-aware, and/or stereo capabilities. In one embodiment, the camera 12 is a front-mounted camera for a mobile phone having a frame rate ranging between about 20 fps to about 120 fps.

With continuing reference to FIG. 2, the user device 10 includes the speaker 14. The speaker 14 can include a transducer for converting an electrical signal into sound. Additionally, the speaker 14 can include an amplifier for boosting a magnitude of a received electrical signal and/or a filter for reducing signal noise. Although only a single speaker 14 is illustrated in FIG. 2, a multitude of speakers can be employed to provide enhanced audio capabilities.

The display 16 can be any of a variety of displays, including flat panel displays utilizing plasma, electroluminescent, organic light emitting diode (OLED), liquid crystal display (LCD), and/or interferometric modulator device (IMOD) technologies. However, in certain embodiments, the display 12 can be a non-flat-panel display, such as a cathode ray tube (CRT) or other tube device. Although a virtual keyboard permits a user to provide input to the user device 12 without physically touching a display surface, in certain embodiments, the display can be a touch screen display, and the virtual keyboard described herein can be employed as an auxiliary input device.

The memory 21 can be any of a wide variety of storage mediums, including for example, RAM memory, flash memory, registers, a hard disk, a removable disk or card, and/or any other form of storage medium known in the art. The memory 21 can include image data 33, virtual keyboard and sensor layout data 34, sensor actuation data 35, and gesture recognition templates 36, as will be described later below. In certain implementations, the memory 21 can include instructions for performing all or part of the functionality associated one or more modules of the user device 10, including, for example, the video processing module 18, the feature extraction module 20, the gesture endpoint detection module 22, the gesture pattern matching module 24, the false alarm rejection module 30, and/or the audio processing module 32.

As shown in FIG. 2, the video processing module 18 can be in communication with the camera 12, and can receive a sequence of images captured by the camera 12. The video processing module 18 can perform a variety of functions on the received images, including, for example, color signal processing, analog-to-digital conversion and/or gamma correction. The video processing module 18 can receive a sequence of images from the camera 12 containing a hand or finger of the user, and the video processing module 18 can be configured to invert each image to generate a mirrored image. The video processing module 18 can provide the inverted and/or non-inverted image to the video feature extraction module 20, as well as to other modules. The data can be stored as image data 21 in the memory 21.

The video processing module 18 can combine processed or unprocessed images with a virtual keyboard image to form combined images. For example, an inverted image of the hand or finger of the user can be overlaid on a virtual keyboard image that is at least partially transparent. The combined images can be enhanced to include visual feedback, as will be described in detail below, and can be provided to the display 16. As will be described below, displaying an inverted image of the hand or finger of a user combined with an image of a virtual keyboard can aid the user in inputting data and/or commands using the virtual keyboard.

The video feature extraction module 20 can receive a sequence of images from the video processing module 18 and/or the memory 21, and can process the sequence of images to determine areas of motion. For example, the video feature extraction module 20 can compare a received frame to a frame earlier in the captured sequence, such as the immediately preceding frame, and compute a difference image between the frames. The difference image can be filtered in any suitable manner, including, for example, by removing differences below a threshold so as to produce a filtered difference image. The filtered and/or unfiltered difference images can be stored as image data 33 in the memory 21.

With continuing reference to FIG. 2, the video feature extraction module 20 can compare the filtered difference images against a virtual keyboard and virtual sensor layout 34 stored in the memory 21 so as to determine one or more virtual key actuations. For example, the virtual keyboard can include a plurality of virtual sensors, which can have corresponding pixel locations in the image. The motion of the user's hand or finger can be compared relative to the location of the virtual sensors so as to determine an actuation of the virtual sensors. For example, when a change in motion is detected at a particular pixel coordinate corresponding to a particular virtual sensor, the virtual sensor can be actuated at that time instance. As persons of ordinary skill in the art will appreciate, the sensor actuations of the virtual sensors information captures both geographical and temporal information related to the motion of the user's hand or finger across the virtual keyboard. The virtual sensor actuations can be collected over time to form sensor actuation data 35, which can be stored in the memory 21. For example, the virtual sensor actuations can be stored over a number of frames ranging between about 1 frame to about 30 frames.

The gesture endpoint detection module 22 can analyze the sequence of difference images generated by the feature extraction module 20 to determine a gesture endpoint. For example, the gesture endpoint detection module 22 can be configured to locate one or more frames having a relative low motion detected after a sequence of one or more frames containing a relatively high motion. Upon determining that a gesture endpoint has detected, the gesture endpoint detection module 22 can communicate the location of a gesture endpoint to the gesture pattern matching module 24, such as the location of the frame containing the gesture endpoint or a position in the sensor actuation data 35 corresponding to a termination of a gesture.

With continuing reference to FIG. 2, the gesture pattern matching module 24 can receive the location of the gesture endpoint from the gesture endpoint detection module 22. The gesture pattern matching module 24 can be in communication with the memory 21, and can use the gesture endpoint and the sensor actuation data 35 to determine if the sequence of sensor actuations matches one or more gesture recognition templates 36. For example, the input gesture actuation sequence can be compared against each gesture recognition template to determine if a recognized gesture has occurred, and can determine the actuated key or keys corresponding to the recognized gesture. In one embodiment, the gesture pattern matching module 24 employs dynamic time warping (DTW) to aid in matching gestures of varying speeds.

Upon recognizing a gesture and/or during the recognition process, the gesture pattern matching module 24 can provide the detection information to a false alarm rejection module 30. The false alarm rejection module 30 can determine if a motion condition of the device 10 is above a threshold. For example, the false alarm rejection module 30 can determine if the total number of actuated virtual sensors across one or more frames associated with the gesture exceeds a threshold so as to determine a global motion condition. Additionally, the false alarm rejection module 30 can analyze the number of actuated sensors in a geographical neighborhood of the actuated key to determine a local motion condition. The global and local motion conditions can be used to determine if there is sufficient likelihood that a user gesture has been incorrectly recognized. Although the false alarm rejection module 30 can be configured to analyze sensor actuation data 35 so as to determine global motion and local motion conditions, in certain embodiments, the false alarm rejection module 30 can also determine a false alarm by analyzing image data, such as the image data 33 stored in the memory 21.

The false alarm rejection module 30 can be in communication with the video processing module 18 and/or the audio processing module 32 to aid in providing feedback to the user. For example, upon determining that a detected gesture is valid, the false alarm rejection module 30 can coordinate with the audio processing module 32 so as to initiate a sound indicating that a virtual key has been actuated using the speaker 14. Similarly, the false alarm rejection module 30 can coordinate with the video processing module 18 so as to provide visual feedback with a virtual key is actuated, such as by enhancing a border of the virtual key with a color. When the false alarm rejection module 30 determines that a gesture recognized by the gesture pattern matching 24 has an unacceptably high risk of being false, the false alarm rejection module can communicate with the audio processing module 32 and/or video processing module 18 to provide visual and/or audio feedback to the user indicating that a gesture was not recognized.

Although the user device 10 has been illustrated as including certain modules, in certain embodiments, the user device 10 can include more or fewer modules. For example, the user device 10 need not include a separate audio processing module 32, and/or the user device 10 can include a vibration module for providing vibratory feedback to a user. Additionally, the user device 10 can include a network interface module so that the user device 10 can communicate over a network, such as the network 2 of FIG. 1. The network interface module can be in communication with an antenna and transceiver used for transmitting and receiving radio frequency signals.

The user device 10 can be placed in a housing formed from any of a variety of manufacturing processes, including, for example, injection molding, and/or vacuum forming. The housing can be constructed from any suitable materials, including, but not limited to, plastics, metals, glasses, rubbers, and/or ceramics. The housing can include removable portions that may be interchanged with other removable portions of different color and containing logos, pictures, or symbols. Furthermore, the user device 10 can include an energy storage device, including, for example, a rechargeable battery, such as a nickel-cadmium battery or a lithium-ion battery, or a solar cell. In certain embodiments, the user device 10 can receive power from a wall outlet.

Figure 3:
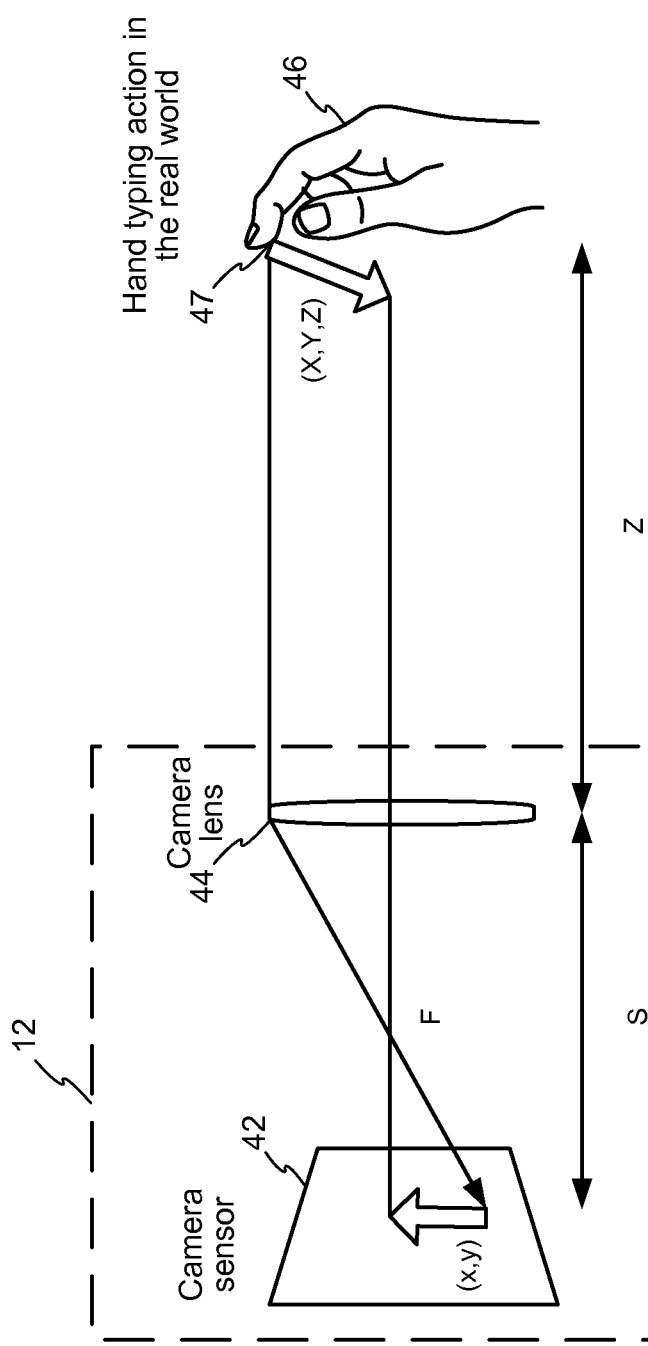
FIG. 3 is a schematic diagram of a camera capturing a hand motion of a user.

FIG. 3 is a schematic diagram of the camera 12 capturing a hand motion of a user. The camera 12 includes a camera sensor 42 and camera lens 44, and the camera 12 has been positioned to capture a hand typing action of a hand 46 of the user. The motion of a point of the hand 46, such as fingertip location 47, can have three-dimensional coordinates (X,Y,Z) in the real world, where Z represents the distance from the camera lens to the fingertip location 47.

The camera lens 44 can receive the image of the user's hand and focus the image on the camera sensor 42. The camera lens 44 can have a focal length F. The camera sensor 42 can be, for example, a CCD or CMOS sensor configured to convert light received into discrete signals corresponding to the intensity of the light. The camera sensor 42 and the camera lens 44 can be separated by an image distance S.

The projected image of the fingertip location 47 on a surface of the camera sensor 42 can have coordinates (x,y), which can be represented by equation 1 below, wherein X, Y, Z, x, y, and S are as defined above and C is a constant related to the degree of horizontal (x) and vertical (y) change in the projected image in two-dimensional space caused by a depth (Z) change of the fingertip in three-dimensional space.

$$\begin{pmatrix} x \\ y \end{pmatrix} = \frac{1}{Z} \begin{pmatrix} S & 0 & C \\ 0 & S & C \end{pmatrix} \begin{pmatrix} X \\ Y \\ Z \end{pmatrix} \qquad \text{Equation 1}$$

For embodiments employing a relatively thin camera lens 44, the inverse of the focal length F can be equal to the sum of the inverse of the object distance Z and the image distance S. This relationship can be expressed using equation 2 below.

$$\frac{1}{F} = \frac{1}{S} + \frac{1}{Z} \qquad \text{Equation 2}$$

Equation 2 can be rearranged in terms of the image distance S, and can be combined to yield equation 3 below.

$$\begin{pmatrix} x \\ y \end{pmatrix} = \begin{pmatrix} \frac{F}{Z-F} & 0 & C \\ 0 & \frac{F}{Z-F} & C \end{pmatrix} \begin{pmatrix} X \\ Y \\ Z \end{pmatrix} \qquad \text{Equation 3}$$

Equation 3 can be differentiated with respect to time to yield equation 4 below.

$$\begin{pmatrix} \frac{dx}{dt} \\ \frac{dy}{dt} \end{pmatrix} = \begin{pmatrix} \frac{F}{Z-F} & 0 & C \\ 0 & \frac{F}{Z-F} & C \end{pmatrix} \begin{pmatrix} \frac{dX}{dt} \\ \frac{dY}{dt} \\ \frac{dZ}{dt} \end{pmatrix} \qquad \text{Equation 4}$$

As persons of ordinary skill in the art will appreciate, Equation 4 can be used to estimate the motion of the projected fingertip image on the camera sensor 42 in terms of the motion at fingertip location 47.

As shown by Equation 4, even a relatively simple camera, such as a camera of a mobile phone having a fixed-focal length lens can detect motion of a user's hand in air. Accordingly, as will be described in further detail below, in certain embodiments, the user device 10 can provide a virtual keyboard even when the user device 10 does not include a camera having zoom, infrared, depth-aware, or stereo capabilities.

Figure 4:
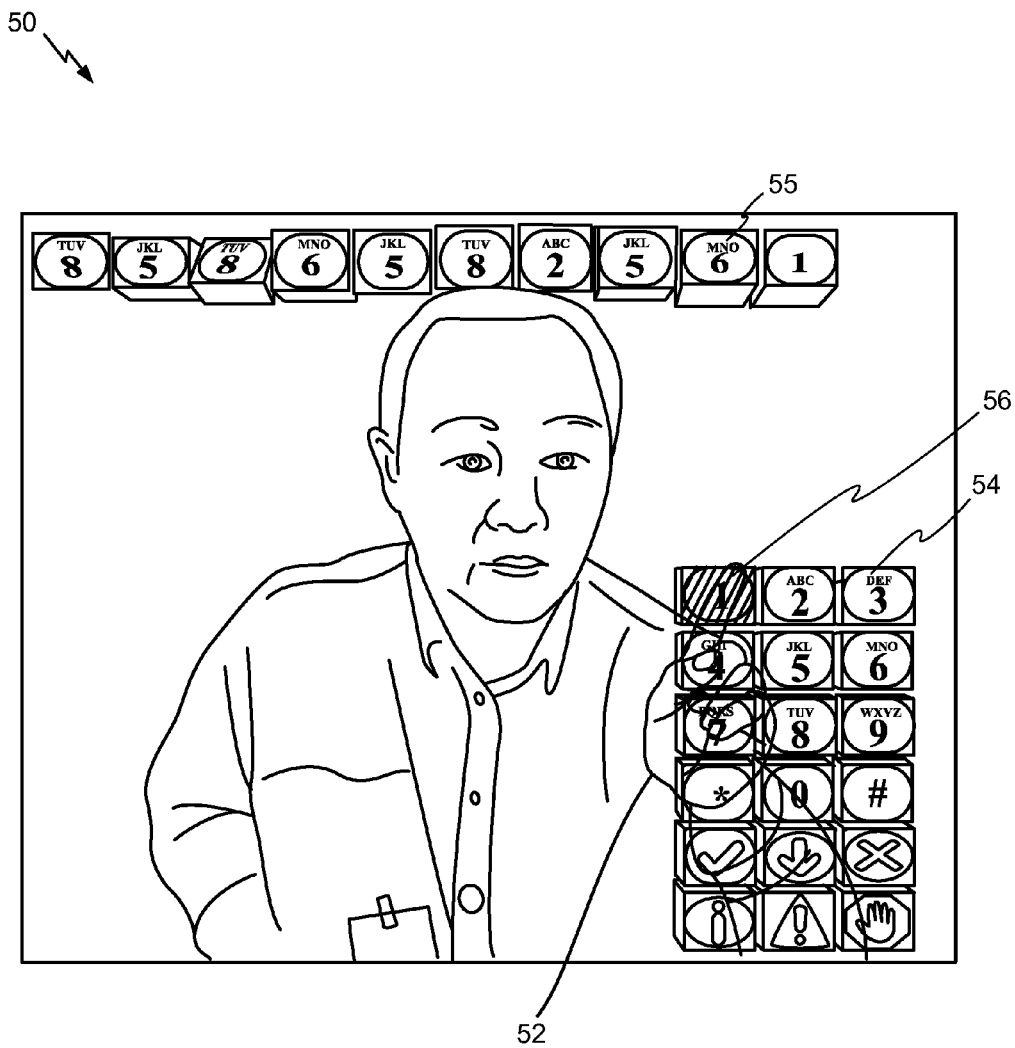
FIG. 4 illustrates a virtual keyboard image overlaid on a hand image of a user in accordance with one embodiment.

FIG. 4 illustrates a virtual keyboard image overlaid on a hand image of a user in accordance with one embodiment. The image 50 includes an image of a virtual keyboard 54 overlaid on an image 52 containing a hand of a user. The image 50 can be generated by the video processing module 18 and displayed on a display, as was described above.

The image 52 containing the user's hand has been inverted so as to produce a mirror image of the user's hand. The image of the virtual keyboard 54 is semi-transparent, thereby permitting the underlying image 54 of the user's hand to be partially visible to the user. As shown in FIG. 4, a virtual key 56 has been enhanced in response to a user's actuation. Enhancement of the virtual key can include changing the key color, highlight, shape, brightness or other aspect of the key. Accordingly, enhancement of the key provides a visual indicator to the user that the virtual key has been activated by a keystroke. In addition, although not illustrated in FIG. 4, one or more keys can be selectively illuminated in response to a false alarm, such as a key-stroke or other gesture detected in an image that contains a relatively high degree of local and/or global motion. For example, the false alarm module 30 can be configured to illuminate one or more virtual keys with a first color when a valid key-stroke is detected, and to illuminate one or more virtual keys with a second color when a false alarm is detected.

FIG. 4 also shows that a keystroke history 55 can be displayed to a user to aid in a user interacting with the virtual keyboard. The keystroke history 55 can be displayed on any suitable portion of the screen, such as at the top of the screen. As illustrated, the keystroke history 55 indicates a sequence of dialed numbers. However, the keystroke history 55 can be modified to display any sequence of user input, including, for example, letters, symbols and/or commands.

Although only one virtual keyboard 54 is illustrated in FIG. 4, a plurality of virtual keyboards can be displayed on a screen. Providing a plurality of virtual keyboards on the screen provides great flexibility in designing keyboards of a variety of shapes and sizes for different applications.

Figure 5:
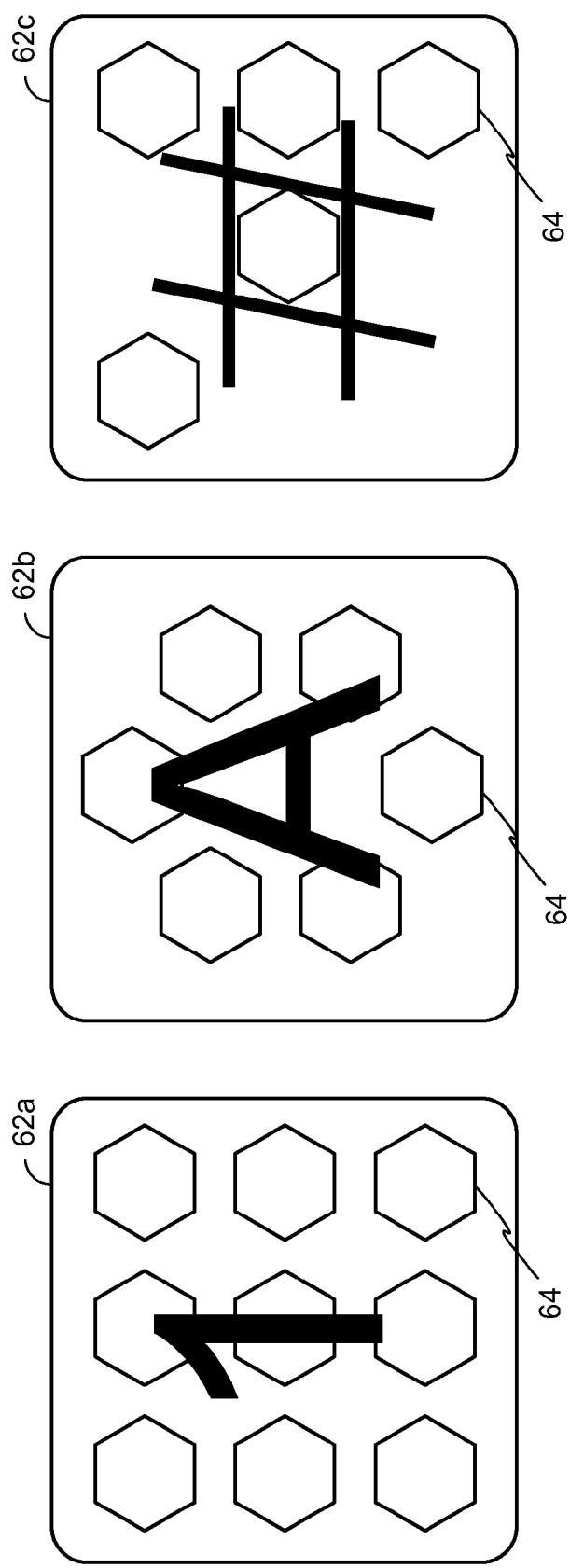
FIG. 5 is a schematic diagram of three examples of virtual sensor layouts for virtual keys.

FIG. 5 is a schematic diagram of three examples of virtual sensor layouts for virtual keys. A virtual keyboard may include a plurality of virtual keys each having a plurality of virtual sensors 64. For example, FIG. 5 illustrates a first virtual key 62a corresponding to the key "1", a second virtual key 62b corresponding to the letter "A", and a third virtual key 62c corresponding to the symbol "#".

Each virtual key can have the same number of sensors and the same sensor array layout. However, each virtual key need not have the same number of sensors or the same layout. For example, the configuration of virtual sensors 64 is different between the first, second, and third virtual keys 62a-62c. The first virtual key 62a includes nine virtual sensors arranged in an array, the second virtual key 62b includes six virtual sensors arranged around a circumference of a circle, and the third virtual key 62 includes five virtual sensors arranged along a diagonal and a right edge of the key. In certain embodiments, alphanumeric keys have a similar virtual sensor array layout, but one or more keys, such as a space bar key, can have a larger number of virtual sensors and a different virtual sensor layout.

Each virtual sensor 64 can correspond to a region of adjoining pixels in an image. For example, each virtual sensor 64 can include a number of pixels ranging between about 10 pixels to about 10,000 pixels. Although each virtual sensor 64 is illustrated as having an area which is substantially hexagonal, each virtual sensor can have a variety of shapes, including, but not limited to, a shape which is rectangular or square.

The virtual sensors 64 need not be displayed when the virtual keyboard is displayed to the user. Rather, the virtual sensor 64 can be associated with pixel regions of the virtual keyboard but not displayed, and can be used by the system in determining a hand or finger gesture of the user. For example, motion of the user's hand or finger over the virtual sensor 64 can trigger the virtual sensor. In one embodiment, when motion of the user's hand or finger is detected over any pixel of the virtual sensor, the virtual sensor is determined to be actuated. In another embodiment, when the motion of the user's hand or finger is detected over between about 20% to about 100% of the pixels of the virtual sensor, the virtual sensor is determined to be actuated.

The state of virtual sensor actuations can be stored for each frame, and a pattern of virtual sensor actuations across a plurality of frames can be obtained. The sequence of virtual sensor actuations over a plurality of frames can be used to recognize a gesture. For example, a gesture pattern matching module, such as the gesture pattern matching module 24 of FIG. 2, can compare the sequence of virtual sensor actuations against one or more gesture recognition templates to determine the presence of a recognized gesture. Employing pattern matching using a sequence of virtual sensor actuations can reduce the computation time relative to an approach matching entire frames, and can permit the application of matching algorithms such as dynamic time warping (DTW), which can provide gesture matching for gestures of a wide variety of speeds. Additional details of gesture pattern matching will be described later below with reference to FIGS. 7-9.

Figure 6:
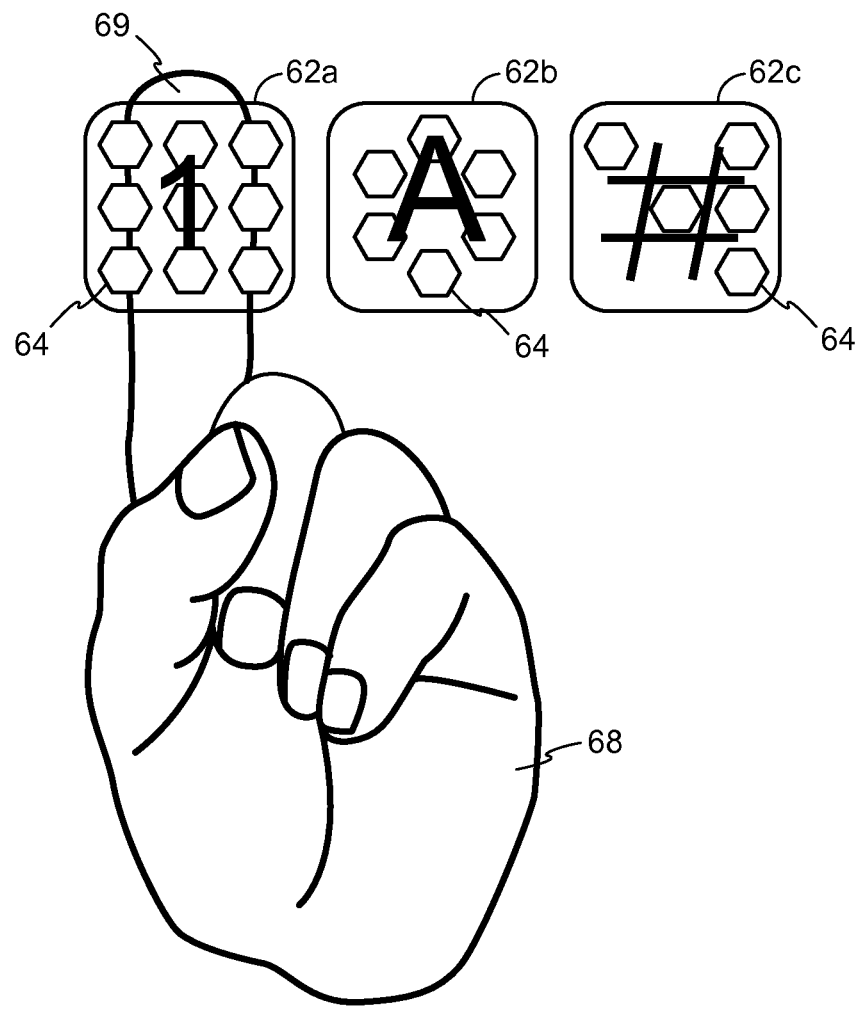
FIG. 6 is a schematic diagram of the virtual keys of FIG. 5 overlaid on a hand image of a user.

FIG. 6 is a schematic diagram of the virtual keys of FIG. 5 overlaid on a hand image of a user.

As shown in FIG. 6, the hand image 68 includes a finger image 69 of the user. The finger image 69 is positioned over virtual key 62a. As described earlier, when a user moves a hand or finger, a difference image or motion vector can be determined. The motion vectors can be tracked relative to the virtual keyboard, and motion vectors having a magnitude greater than a threshold can actuate virtual sensors at corresponding pixel locations. Thus, a user finger positioned in a substantially stationary position over one or more virtual sensors would not result in the virtual sensors being actuated. However, upon moving the user's finger with sufficient velocity, one or more virtual sensors can be actuated. The history of virtual sensor actuations can be stored, and the history of virtual sensor actuations can be matched against one or more gesture recognition templates so as to determine a gesture of the user.

By employing virtual sensors, both geographical and temporal information about the motion of the user's hand can be obtained. The information can indicate a direction of a user's motion. Additional details of gesture recognition will be described below with reference to FIGS. 7-9.

Figure 7:
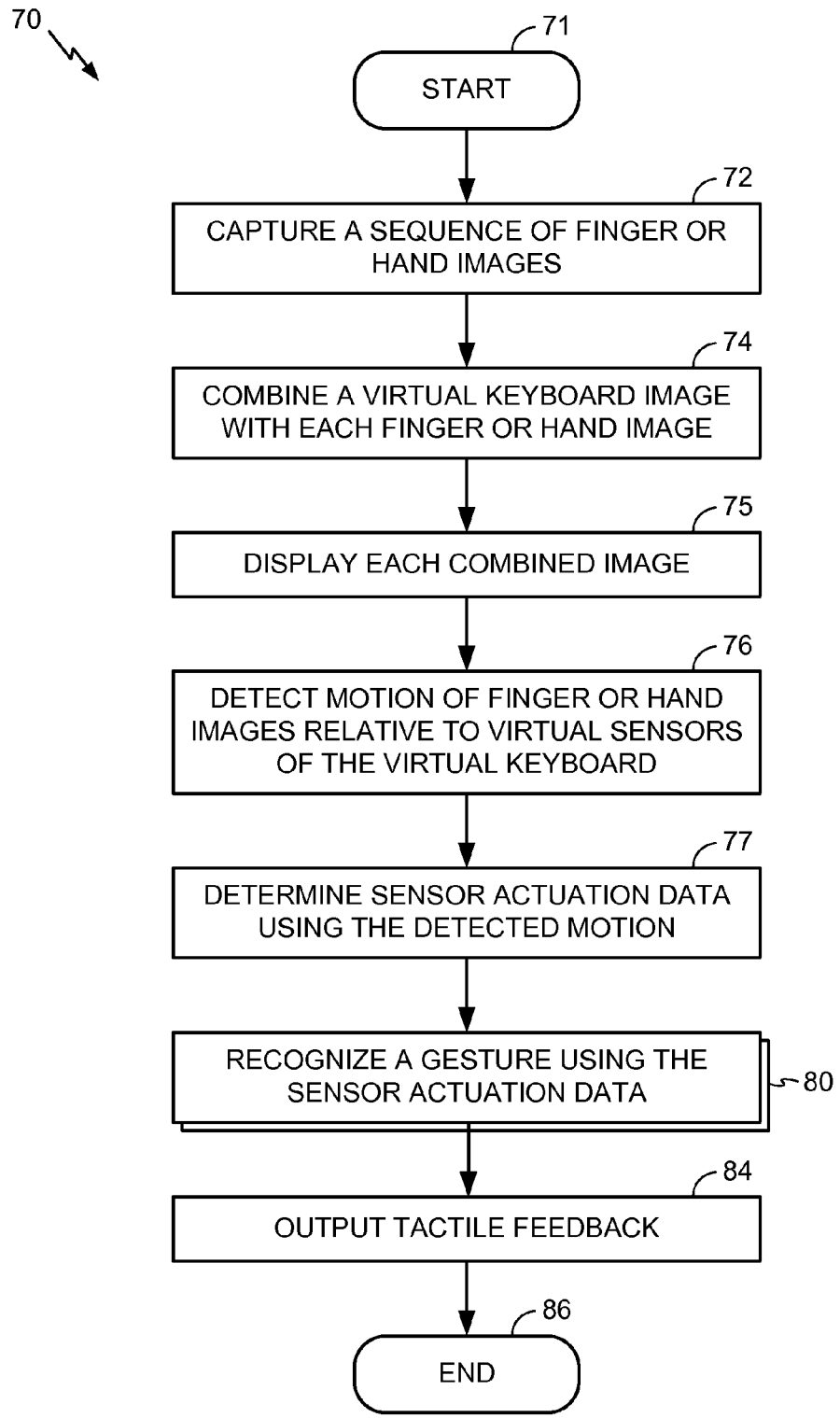
FIG. 7 is a flow diagram of one embodiment of a method of providing a virtual keyboard.

FIG. 7 is a flowchart of a method 70 of providing a virtual keyboard in accordance with one embodiment. It will be understood that not all of the illustrated blocks are required, and that this method can be modified without departing from the spirit and scope of the invention.

The method 70, depicted from the point of a user device, such as the user device 10 of FIG. 2, starts at block 71. In an ensuing block 72, the user device captures a sequence of finger or hand images. For example, a camera of a user device can capture a sequence of images containing a hand or finger of a user. The images can be processed for color signal processing, A/D conversion and/or gamma correction, and the images can be inverted.

In an ensuing block 74, the user device combines a virtual keyboard image with each finger or hand image. For example, a virtual keyboard image can be overlaid on the image obtained and inverted in block 72. The virtual keyboard image can be at least partially transparent, so as to permit the underlying image of the hand or finger of the user to be at least partially visible when displayed.

In an ensuing block 75, the combined image is displayed on a display. Providing a combined image having both a virtual keyboard and a user's hand or finger can aid a user in interacting with the virtual keyboard. As described above with respect to the block 72, the image of the user's hand can be inverted before being displayed to the user, so as to improve the usability of the virtual keyboard system.

The method 70 continues at a block 76, in which the user device detects motion in the finger or hand image relative to virtual sensors of the virtual keyboard. For example, the user device can process the sequence of images captured in block 72 to determine areas of motion, such as by computing a difference between sequential images to generate one or more difference images. The difference images can be filtered in any suitable manner, such as by removing differences below a threshold so as to produce filtered difference images.

In an ensuing block 77, the detected motion is used to determine sensor actuation data. For example, pixel regions of filtered difference images containing motion can be compared to the pixel regions of the virtual sensors, and virtual sensors having sufficient motion can be determined to be actuated. For example, a virtual sensor may occupy a plurality of pixels, and detected motion over 20% or more of the pixels of the virtual sensors can indicate that a sensor has been actuated. The virtual sensor actuation data can be accumulated over a plurality of frames.

The method 70 of providing a virtual keyboard continues at a block 80, in which a gesture is recognized using the sensor actuation data. For example, the user device can compare the sensor actuation data to one or more gesture recognition templates to determine if a gesture has been detected. Additional details on gesture recognition templates can be found below with respect to FIG. 8B. The gesture matching process can result in a list of candidate hand gestures, which may include different user gestures and/or different virtual keys. In certain implementations, the gesture pattern recognition 80 can generate a confidence factor for each candidate hand gesture, and can use the confidence factors to determine the recognized gesture. More details on one implementation of the block 80 are described below with reference to FIG. 9.

The method 84 of FIG. 7 continues at a block 84, in which tactile feedback, such as visual audio, and/or vibratory feedback, is outputted to a user. For example, when recognizing a key-stroke, a sound can be generated indicating an actuation and/or the key can be visually enhanced on the display, such as by highlighting the key. Additionally, when a gesture is recognized in block 80, but determined to have an unacceptable risk of falseness, visual, auditory, and/or vibratory feedback can be used to indicate that the gesture was not recognized. For example, a highlight of a different color can be provided to the user and/or a sound indicating a rejected keystroke can be generated.

Figure 8A:
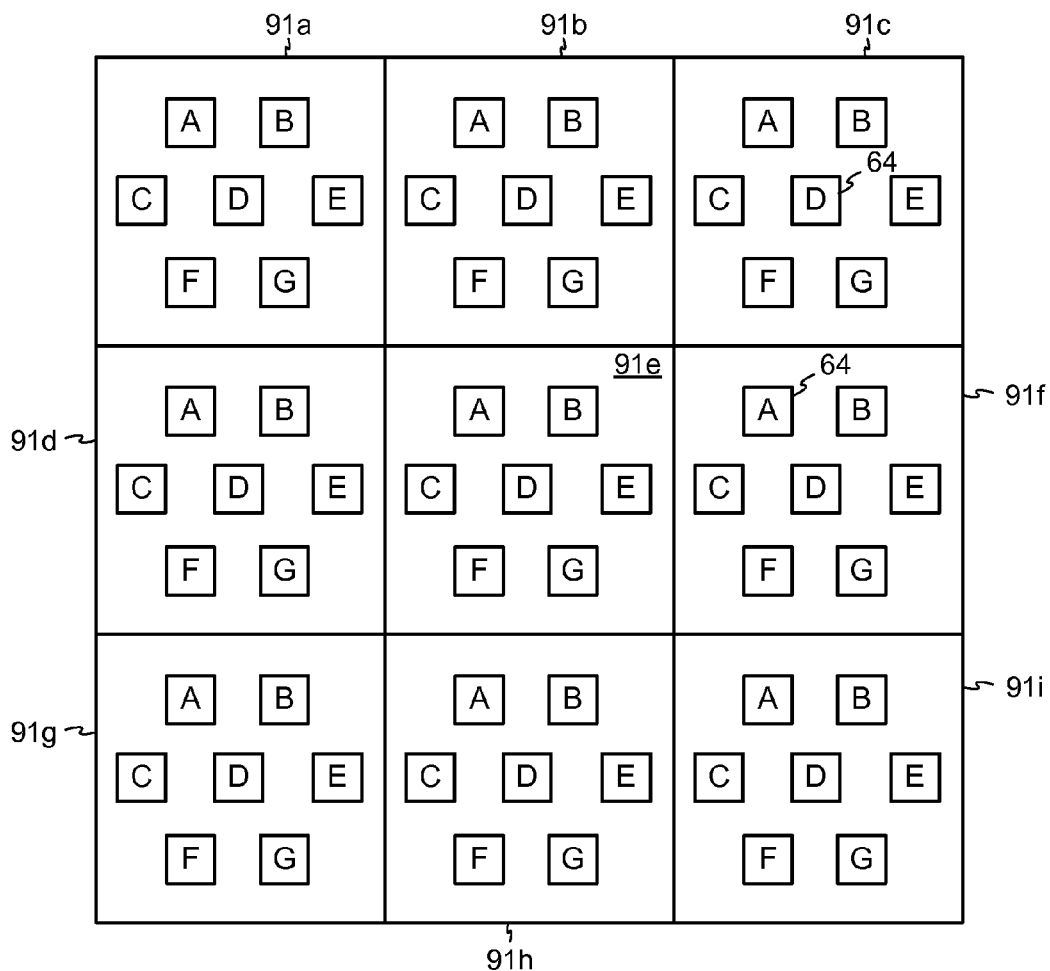
FIG. 8A is a portion of a virtual keyboard according to one embodiment.

FIG. 8A is a portion of a virtual keyboard according to one embodiment. The portion of the virtual keyboard includes nine virtual keys 91a-91i, and each virtual key includes seven virtual sensors 64. For illustrative purposes, the virtual sensors 64 for each virtual key 91a-91i have been labeled with the letters A through G.

Sensor actuation data for the keys 91a-91i can be stored across a plurality of frames, as was described earlier. The sensor actuation data can include information indicating whether a sensor of a key 91a-91i was actuated at a given instance of time or in a given frame. For example, in an embodiment in which sensor actuation data is stored for 10 frames, 630 sensor actuations can be recorded, corresponding to 7 actuations for each of 9 keys for each of 10 frames.

Figure 8B:
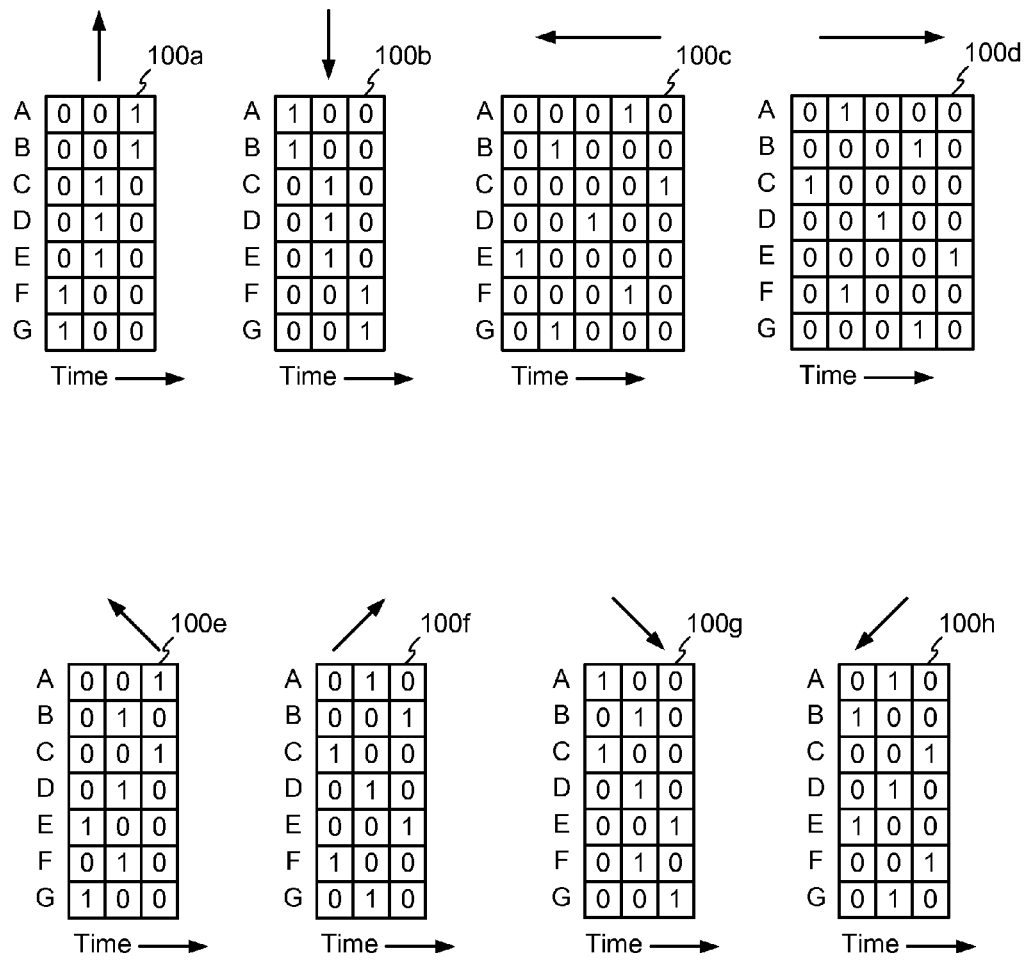
FIG. 8B illustrates an example of eight gesture recognition templates for detecting eight directions of hand or finger motion across the portion of the virtual keyboard of FIG. 8A.

FIG. 8B illustrates an example of eight gesture recognition templates 100a-100h for detecting eight directions of hand or finger motion across the portion of the virtual keyboard of FIG. 8A. Each gesture recognition template includes an array of zeros and ones, with a one ("1") designating an actuation and a zero ("0") designation no actuation. The rows of the gesture recognition templates represent a particular sensor location (corresponding to the sensor locations illustrated in FIG. 8A), and the columns of the templates represents a progression of frames over time.

The gesture recognition templates 100a-100h can be used to detect motion in any of eight directions across any of the keys 91*a*-91*i* of FIG. 8A. For example, the gesture recognition template 100*a* includes a first column having ones in the sensor F and G entries and zeros in the remaining entries, a second column having ones in the sensor C, D and E entries and zeros in the remaining entries, and a third column having ones in the sensor A and B entries and zeroes in the remaining entries. Since the columns of the illustrated gesture recognition templates are arranged in temporal progression, an actuation of sensors F and G, followed by an actuation of sensors C, D and E, followed by an actuation of sensors A and B can indicate an upward movement of a hand or finger across a virtual key. By analyzing the gesture recognition template 100*a* against sensor actuation data for each of the keys 91*a*-91*i*, upward motion of a hand or finger of a user across one or more of the keys 91*a*-91*i* can be detected. Similarly, the gesture recognition templates 100*b*-100*h* can be used to determine motion in other directions across one or more of the keys 91*a*-91*i*.

As shown in FIG. 8B, not all gesture recognition templates need to be the same size. Rather, certain gesture recognition templates can be associated with patterns of a longer duration.

Hand and/or motion speed may not be consistent between users. Additionally, a frame rate of a camera may be different in various applications, leading to more or fewer frames associated with a given period of time. Accordingly, gesture recognition using the gesture recognition templates can be performed over frame sequences of varying speeds. For example, dynamic time warping (DTW) can be applied between a sequence of sensor actuation information and a sequence contained in a gesture recognition template to determine a match. Using DTW permits the sequences can be warped non-linearly in the time dimension to determine a measure of their similarity.

Figure 8C:
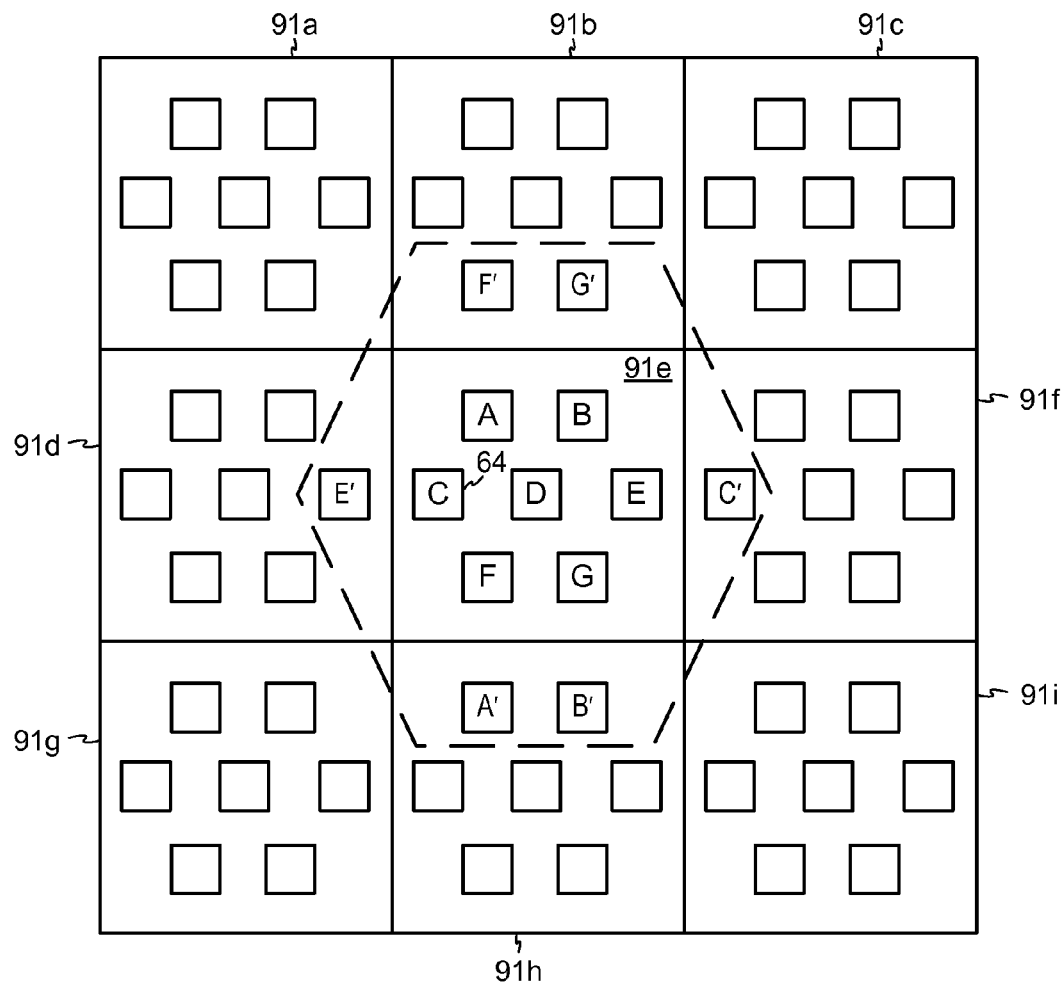
FIG. 8C illustrates a portion of a virtual keyboard according to another embodiment.
Figure 8D:
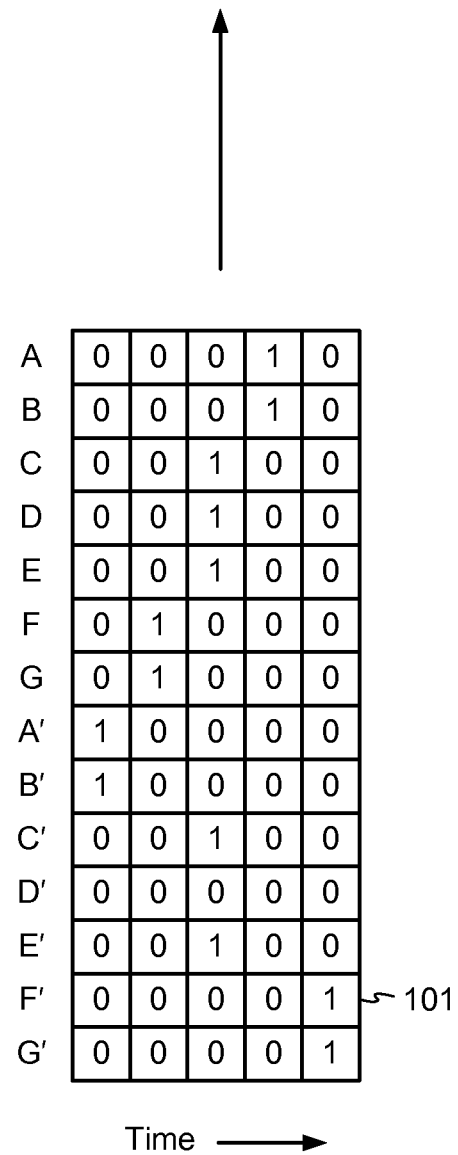
FIG. 8D illustrates an example of a gesture recognition template for detecting a gesture across the portion of the virtual keyboard of FIG. 8C.

The gesture recognition templates 100*a*-100*h* are configured to use sensor data across a single key to recognize a gesture. However, gesture recognition templates can be much more complex, and can include sensor data across all or part of one or more additional keys. For example, FIG. 8C illustrates a portion of a virtual keyboard according to another embodiment, and FIG. 8D illustrates an example of a gesture recognition template 101 for detecting a gesture across the portion of the virtual keyboard of FIG. 8C. The gesture recognition template 101 includes sensor actuation information associated with sensors across a plurality of keys, and can be used, for example, to detect upward motion across a key. Providing a gesture recognition template using sensor information across a plurality of keys can provide a number of benefits, including, for example, improving gesture recognition accuracy. In one implementation, a gesture recognition template is associated with sensors from a number of keys ranging between about 2 keys to about 25 keys, for example, about 18 keys.

The gesture recognition templates can be configured to recognize a wide variety of gestures besides the direction of a user's hand or finger. For example, gesture recognition templates can be provided for recognizing typing gestures, hold-and-drag gestures, pointing gestures, and/or any other suitable gesture. The gesture recognition templates can be generated based on user data collected across a wide variety of users, and implemented using statistical models, such as hidden Markov models. However, in certain implementations, a training program can be employed to aid in generating and/or refining user-specific gesture recognition templates.

In certain implementations, a template need not perfectly match the sensor actuation data for a gesture to be recognized. Rather, a list of candidate gestures can be generated, and a confidence factor can be computed for each candidate gesture. In certain implementations, the gesture with the highest confidence factor can be considered the recognized gesture. For example, in an implementation having i gesture templates and j virtual keys, a gesture pattern matching confidence factor can be calculated for each of the i gestures and j keys, and the particular combination of key and gesture template having the highest pattern matching confidence factor can be the recognized key and gesture.

Figure 9:
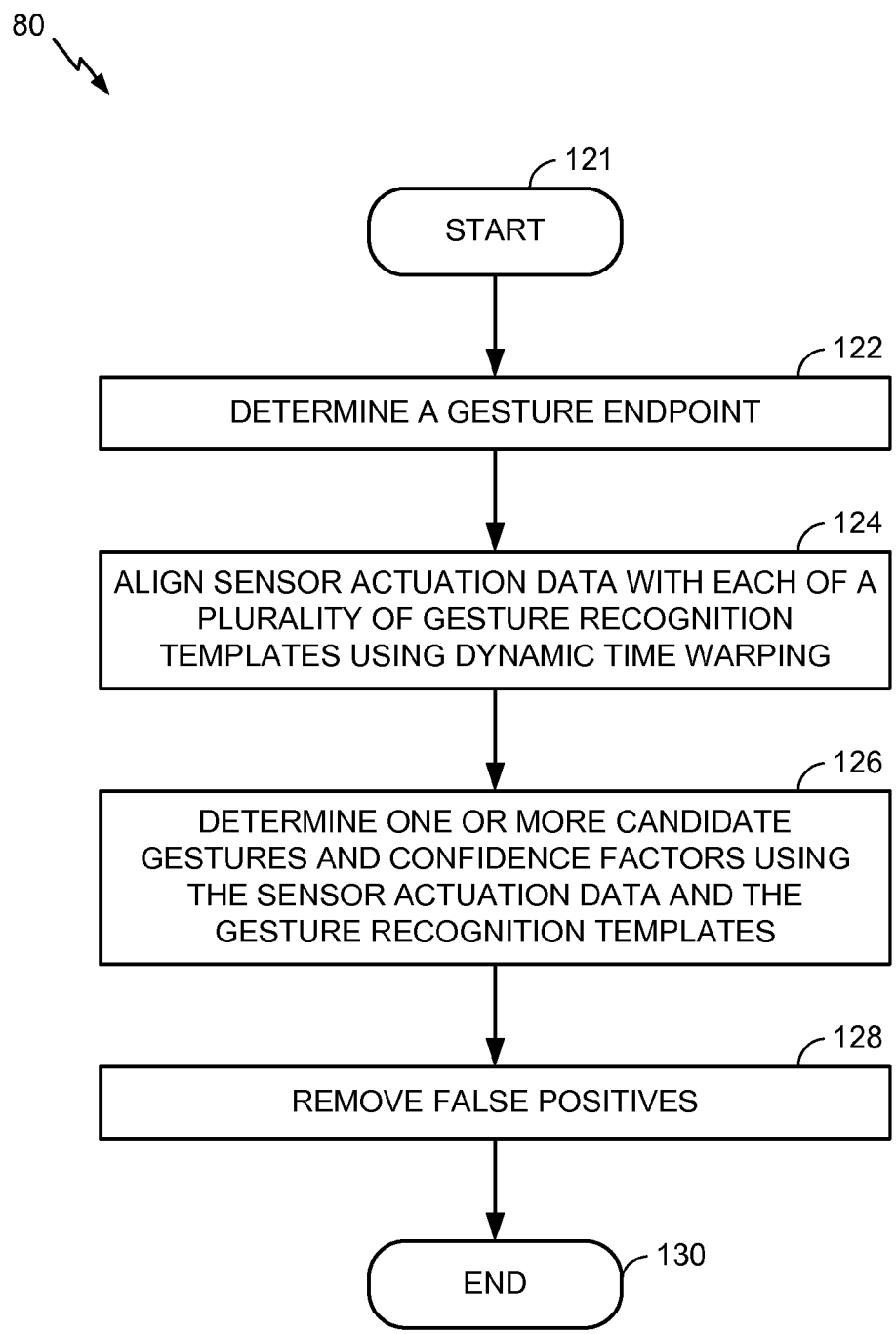
FIG. 9 is a flow diagram of one embodiment of a method of recognizing a gesture.

FIG. 9 is a flow diagram of one embodiment of the method in process block 80 of recognizing a gesture from FIG. 7. It will be understood that not all of the illustrated blocks are required, and that this method can be modified without departing from the spirit and scope of the invention.

The method 80, depicted from the point of a user device, such as the user device 10 of FIG. 2, starts at block 121. In an ensuing block 122, a gesture endpoint is detected. For example, the user device can determine that a gesture endpoint is present if the frame has a relative low level of motion, and is positioned after one or more frames containing a relatively high level of motion.

In an ensuing block 124, dynamic time warping (DTW) is used to align sensor actuation data with each of a plurality of gesture recognition templates. The endpoint detected in block 122 can be used to reduce a computational load associated with the DTW processing. As described earlier, each gesture recognition template can include a sequence of sensor actuations corresponding to a recognizable gesture, and the sensor actuation data can represent a sequence of virtual sensor actuations determined based on the user's interaction with the virtual keyboard. Since the number of frames associated with a gesture can vary based on a variety of factors, such as the hand and/or motion speed of a user and/or a camera frame rate, the gesture recognition template and the sensor actuation data can correspond to patterns changing at different rates or speeds. Thus, employing DTW can aid in aligning one or more gesture recognition templates with the sensor actuation data, thereby facilitating gesture matching.

The method 80 continues at a block 126, in which one or more candidate gestures and corresponding confidence factors are determined using the sensor actuation data. For example, each gesture recognition template can be compared to the sensor actuation data after using DTW to account for a temporal variation between the sequences. The comparison of each gesture recognition template to the sensor actuation data can result in one or more potential gesture matches. Each potential gesture match can be assigned a confidence factor based on a similarity of the gesture recognition template to the sensor actuation data, and potential gesture matches of a sufficient confidence factor, such as a potential gesture match over a threshold confidence level, can be determined to be a candidate gesture. The candidate gestures and the corresponding confidence factors determined using each gesture recognition template can collective form a list of candidate gestures and confidence factors.

In an ensuing block 128, false positives are removed. For example, removing false positive can include determining if the total number of actuated virtual sensors across one or more frames associated with the gesture exceeds a threshold and/or analyzing the number of actuated sensors in a geographical neighborhood of the actuated key to determine if there is sufficient likelihood that the recognized gesture has been incorrectly recognized. Removal of false positives can include removal of one or more candidate gestures from the list of candidate gestures using a global motion condition, a local motion condition, and/or one or more confidence factors. A candidate gesture having the highest confidence factor and that is not removed as being a false positive can be determined to be the recognized gesture. The method ends at 130.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more exemplary aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

When implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the present disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for inputting data into a computing device, the system comprising:
    a camera for capturing a sequence of images containing a finger of a user;
    a virtual keyboard comprising a plurality of virtual keys, each virtual key having a plurality of virtual sensors, each virtual sensor comprising a region of adjoining pixels within a corresponding virtual key, wherein a plurality of the virtual keys have different virtual sensor layouts from one another;
    a display for displaying each image of the sequence combined with the virtual keyboard, wherein the position of the finger in the displayed image relative to the virtual keyboard changes as the finger of the user moves relative to the camera;
    a video feature extraction module configured to:
        detect motion of the user's finger in the sequence of images relative to the virtual keyboard,
        identify a sequence of actuated virtual sensors within at least one of the plurality of virtual keys based on the detected motion, wherein a virtual sensor is actuated when the motion of the user's finger is detected over a threshold number of pixels within the region of adjoining pixels corresponding to the actuated virtual sensor, and collect virtual sensor actuation data comprising both geographical and temporal information related to each actuated virtual sensor of the sequence of actuated virtual sensors; and a gesture pattern matching module for using the sequence of virtual sensor actuations to recognize a user's gesture as one of a valid keystroke and a rejected keystroke and input data into the computing device.

2. The system of claim 1, wherein the display overlays the virtual keyboard on each of the images in the sequence, the virtual keyboard being at least partially transparent.

3. The system of claim 1, wherein the system is configured to provide at least one of visual feedback, audio feedback, and vibratory feedback when the gesture is recognized.

4. The system of claim 1, further comprising a gesture endpoint detection module for detecting a gesture endpoint.

5. The system of claim 4, wherein the gesture pattern matching module is configured to compare the sensor actuation data to each of a plurality of gesture recognition templates to recognize the gesture.

6. The system of claim 4, wherein the gesture pattern matching module is configured to compare the sensor actuation data to each of the plurality of gesture recognition templates after the gesture endpoint is detected.

7. The system of claim 5, wherein the gesture pattern matching module is configured to align the senor actuation data to each of the plurality of gesture recognition templates using dynamic time warping.

8. The system of claim 1, further comprising a false alarm rejection module for detecting a motion condition using the sensor actuation data, and to prevent the gesture pattern matching module from recognizing the gesture when the motion condition is above a threshold.

9. The system of claim 8, wherein the false alarm rejection module is configured to provide at least one of visual feedback, audio feedback, and vibratory feedback when the motion condition is above the threshold.

10. A method for inputting data into an electronic device using a virtual keyboard, the method comprising:

receiving a sequence of images containing a finger of a user;

generating a combined image for each image of the sequence, the combined image containing the finger of the user and a virtual keyboard, the virtual keyboard comprising a plurality of virtual keys, each virtual key having a plurality of virtual sensors, each virtual sensor comprising a region of adjoining pixels within a corresponding virtual key, wherein a plurality of the virtual keys have different virtual sensor layouts from one another;

detecting a motion of the finger in the sequence of images relative to the virtual sensors;

identifying a sequence of actuated virtual sensors within at least one of the plurality of virtual keys based on the detected motion, wherein a virtual sensor is actuated when the motion of the user's finger is detected over a threshold number of pixels within the plurality of pixels corresponding to the actuated virtual sensor;

generating sensor actuation data comprising both geographical and temporal information related to each actuated virtual sensor of the sequence of actuated virtual sensors; and recognizing a gesture as one of a valid keystroke and a rejected keystroke using the sequence of virtual sensor actuations to input data into the electronic device.

11. The method of claim 10, further comprising displaying the combined image on a display.

12. The method of claim 11, wherein displaying the combined image comprises displaying the virtual keyboard overlaid on the sequence of images, the virtual keyboard being at least partially transparent.

13. The method of claim 11, further comprising highlighting at least one virtual key after recognizing the gesture.

14. The method of claim 10, wherein recognizing the gesture comprises comparing the senor actuation data to each of a plurality of gesture recognition templates to identify at least one candidate gesture.

15. The method of claim 14, further comprising detecting a gesture endpoint using the detected motion.

16. The method of claim 15, further comprising aligning the sensor actuation data with each gesture recognition template using dynamic time warping.

17. The method of claim 14, further comprising assigning a confidence factor to each candidate gesture.

18. The method of claim 17, wherein recognizing the gesture comprises selecting a gesture from the at least one candidate gesture having the greatest confidence factor.

19. The method of claim 14, further comprising determining a motion condition using the sensor actuation data, and preventing one or more of the at least one candidate gestures from being the recognized gesture when the motion condition is above a threshold.

20. A system for inputting data into a computing device, the system comprising:

means for capturing a sequence of images containing a finger of a user;

means for displaying each image of the sequence combined with a virtual keyboard, the virtual keyboard comprising a plurality of virtual keys, each virtual key having a plurality of virtual sensors, each virtual sensor comprising a region of adjoining pixels within a corresponding virtual key, wherein a plurality of the virtual keys have different virtual sensor layouts from one another, wherein the position of the finger in the displayed image relative to the virtual keyboard changes as the finger of the user moves relative to the camera;

means for detecting motion of the user's finger in the sequence of images relative to the virtual sensors;

means for identifying a sequence of actuated virtual sensors within at least one of the plurality of virtual keys based on the detected motion, wherein a virtual sensor is actuated when the motion of the user's finger is detected over a threshold number of pixels within the plurality of pixels corresponding to the actuated virtual sensor;

means for generating sensor actuation data comprising both geographical and temporal information related to each actuated virtual sensor of the sequence of actuated virtual sensors; and means for recognizing a user's gesture as one of a valid keystroke and a rejected keystroke using the sequence of virtual sensor actuations data to input data into the computing device.

21. The system of claim 20, wherein the means for displaying overlays the virtual keyboard on each of the images in the sequence, the virtual keyboard being at least partially transparent.

22. The system of claim 20, wherein the system is configured to provide at least one of visual feedback, audio feedback, and vibratory feedback when the gesture is recognized.

23. The system of claim 20, further comprising a means for detecting a gesture endpoint.

24. The system of claim 23, wherein the means for recognizing the user's gesture is configured to compare the sensor actuation data to each of a plurality of gesture recognition templates to recognize the gesture.

25. The system of claim 24, wherein the means for recognizing the user's gesture is configured to compare the sensor actuation data to each of the plurality of gesture recognition templates after the gesture endpoint is detected.

26. The system of claim 24, wherein means for recognizing the user's gesture is configured to align the senor actuation data to each of the plurality of gesture recognition templates using dynamic time warping.

27. The system of claim 20, further comprising a means for preventing the gesture pattern matching module from recognizing the gesture when the motion condition is above a threshold.

28. A non-transitory computer-readable storage medium comprising instructions that when executed perform a method of inputting data into an electronic device using a virtual keyboard, the method comprising:
   receiving a sequence of images containing a finger of a user;
   generating a combined image for each image of the sequence, the combined image containing the finger of the user and a virtual keyboard, the virtual keyboard comprising a plurality of virtual keys, each virtual key having a plurality of virtual sensors, each virtual sensor comprising a region of adjoining pixels within a corresponding virtual key, wherein a plurality of the virtual keys have different virtual sensor layouts from one another;
   detecting a motion of the finger in the sequence of images relative to the virtual sensors;
   identifying a sequence of actuated virtual sensors within at least one of the plurality of virtual keys based on the detected motion, wherein a virtual sensor is actuated when the motion of the user's finger is detected over a threshold number of pixels within the plurality of pixels corresponding to the actuated virtual sensor;
   generating sensor actuation data comprising both geographical and temporal information related to each actuated virtual sensor of the sequence of actuated virtual sensors; and
   recognizing a gesture as one of a valid keystroke and a rejected keystroke using the sequence of virtual sensor actuations to input data into the electronic device.

29. The computer-readable storage medium of claim 28, wherein the method further comprises displaying the combined image on a display.

30. The computer-readable storage medium of claim 29, wherein displaying the combined image comprises displaying the virtual keyboard overlaid on the sequence of images, the virtual keyboard being at least partially transparent.

31. The computer-readable storage medium of claim 30, wherein the method further comprises highlighting at least one virtual key after recognizing the gesture.

32. The computer-readable storage medium of claim 28, wherein recognizing the gesture comprises comparing the senor actuation data to each of a plurality of gesture recognition templates to identify at least one candidate gesture.

33. The computer-readable storage medium of claim 32, wherein the method further comprises detecting a gesture endpoint using the detected motion.

34. The computer-readable storage medium of claim 33, wherein the method further comprises aligning the sensor actuation data with each gesture recognition template using dynamic time warping.

35. The computer-readable storage medium of claim 34, wherein the method further comprises assigning a confidence factor to each candidate gesture.

36. The computer-readable storage medium of claim 35, wherein recognizing the gesture comprises selecting a gesture from the at least one candidate gesture having the greatest confidence factor.

37. The computer-readable storage medium of claim 36, wherein the method further comprises determining a motion condition using the sensor actuation data, and preventing one or more of the at least one candidate gestures from being the recognized gesture when the motion condition is above a threshold.

38. The system of claim 1, wherein motion of the user's finger is translated into a motion vector having a magnitude.

39. The system of claim 38, wherein the at least one actuated virtual sensor is actuated when the magnitude of the motion vector is above a threshold.

40. The system of claim 39, wherein a virtual sensor is not actuated when the user's finger is in a substantially stationary position over the virtual sensor.

* * * * *